US007552397B2

(12) United States Patent
Holecek et al.

(10) Patent No.: US 7,552,397 B2
(45) Date of Patent: Jun. 23, 2009

(54) MULTIPLE WINDOW BEHAVIOR SYSTEM

(75) Inventors: Ales Holecek, Bellevue, WA (US);
Charles W. Stabb, Seattle, WA (US);
Hillel N. Cooperman, Seattle, WA (US);
Jeffrey W. Pettiross, Seattle, WA (US);
Mark R. Ligameri, Austin, TX (US);
Kanwal VedBrat, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 11/036,615

(22) Filed: Jan. 18, 2005

(65) Prior Publication Data

US 2006/0161860 A1    Jul. 20, 2006

(51) Int. Cl.
*G06F 3/00* (2006.01)
(52) U.S. Cl. ............... 715/788; 715/759; 715/766; 715/769; 715/767; 715/779; 715/778; 715/781; 715/782
(58) Field of Classification Search ............ 715/779, 715/759, 778, 781, 782, 766, 767, 769
See application file for complete search history.

(56) References Cited

U.S. PATENT DOCUMENTS

| | | | | |
|---|---|---|---|---|
| 4,651,146 | A * | 3/1987 | Lucash et al. | 715/806 |
| 4,653,020 | A * | 3/1987 | Cheselka et al. | 715/788 |
| 4,862,389 | A * | 8/1989 | Takagi | 715/794 |
| 5,412,776 | A | 5/1995 | Bloomfield | |
| 5,463,726 | A | 10/1995 | Price | |
| 5,499,334 | A | 3/1996 | Staab | |
| 5,546,528 | A * | 8/1996 | Johnston | 715/807 |
| 5,651,107 | A | 7/1997 | Frank et al. | |
| 5,668,962 | A | 9/1997 | Kitami | |
| 5,758,110 | A * | 5/1998 | Boss et al. | 715/751 |
| 5,841,435 | A * | 11/1998 | Dauerer et al. | 715/775 |
| 5,874,960 | A * | 2/1999 | Mairs et al. | 715/733 |
| 5,880,733 | A * | 3/1999 | Horvitz et al. | 715/850 |
| 5,889,517 | A | 3/1999 | Ueda et al. | |
| 5,892,511 | A * | 4/1999 | Gelsinger et al. | 715/794 |

(Continued)

OTHER PUBLICATIONS

TDB-ACC-NO: NA 930219—Disclosure Tile: Left-Shift and Right-Shift Buttons for a Standard Window.*

(Continued)

*Primary Examiner*—Sy D Luu
*Assistant Examiner*—Linh K Pham
(74) *Attorney, Agent, or Firm*—Shook, Hardy & Bacon LLP

(57) ABSTRACT

A method for displaying a plurality of windows on a display screen is described. The method includes steps of associating a first window with a second window, where the second window is independent of the first window, arranging the first window and the second window on a display screen, where the first window and the second window are configured to fit within a predetermined region of the display screen, and notifying an application program corresponding to the first window that the second window is associated with the first window. An indicator may appear on the display as a target region when a user desires to associate the first and the second windows. Subsequent operations performed on the first window are performed automatically on the second window. For example, when a user is comparing two documents, she can scroll down one document and have the second document automatically scroll as well.

19 Claims, 18 Drawing Sheets

U.S. PATENT DOCUMENTS

| | | | | |
|---|---|---|---|---|
| 5,920,316 | A * | 7/1999 | Oran et al. | 715/779 |
| 6,008,809 | A * | 12/1999 | Brooks | 715/792 |
| 6,031,530 | A * | 2/2000 | Trueblood | 715/791 |
| 6,040,833 | A * | 3/2000 | Henshaw | 715/794 |
| 6,072,488 | A * | 6/2000 | McFarland | 715/799 |
| 6,108,714 | A | 8/2000 | Kumagai | |
| 6,160,554 | A | 12/2000 | Krause | |
| 6,166,736 | A * | 12/2000 | Hugh | 715/798 |
| 6,184,883 | B1 * | 2/2001 | Bates et al. | 715/794 |
| 6,215,490 | B1 * | 4/2001 | Kaply | 715/788 |
| 6,229,542 | B1 * | 5/2001 | Miller | 715/782 |
| 6,239,798 | B1 * | 5/2001 | Ludolph et al. | 715/788 |
| 6,272,484 | B1 | 8/2001 | Martin | |
| 6,313,855 | B1 | 11/2001 | Shuping | |
| 6,321,209 | B1 | 11/2001 | Pasquali | |
| 6,429,855 | B2 | 8/2002 | Pabon | |
| 6,429,883 | B1 * | 8/2002 | Plow et al. | 715/768 |
| 6,549,218 | B1 | 4/2003 | Gershony et al. | |
| 6,577,330 | B1 * | 6/2003 | Tsuda et al. | 715/782 |
| 6,590,594 | B2 | 7/2003 | Bates et al. | |
| 6,686,938 | B1 | 2/2004 | Jobs et al. | |
| 6,720,982 | B1 | 4/2004 | Sakaguchi | |
| 6,734,873 | B1 | 5/2004 | Herf et al. | |
| 6,781,611 | B1 | 8/2004 | Richard | |
| 6,957,395 | B1 * | 10/2005 | Jobs et al. | 715/765 |
| 6,988,135 | B2 | 1/2006 | Martin | |
| 6,996,783 | B2 | 2/2006 | Brown et al. | |
| 7,028,264 | B2 | 4/2006 | Santoro et al. | |
| 7,047,500 | B2 | 5/2006 | Roelofs | |
| 7,119,819 | B1 | 10/2006 | Robertson et al. | |
| 7,146,573 | B2 | 12/2006 | Brown et al. | |
| 7,250,955 | B1 | 7/2007 | Beeman et al. | |
| 2001/0028368 | A1 | 10/2001 | Swartz | |
| 2001/0035882 | A1 | 11/2001 | Stoakley | |
| 2002/0130904 | A1 * | 9/2002 | Becker et al. | 345/753 |
| 2003/0142140 | A1 | 7/2003 | Brown et al. | |
| 2003/0164862 | A1 | 9/2003 | Cadiz | |
| 2003/0179237 | A1 * | 9/2003 | Nelson et al. | 345/765 |
| 2003/0210270 | A1 * | 11/2003 | Clow et al. | 345/767 |
| 2004/0066408 | A1 | 4/2004 | Meyers et al. | |
| 2004/0174396 | A1 | 9/2004 | Jobs | |
| 2004/0212640 | A1 | 10/2004 | Mann | |
| 2004/0255254 | A1 * | 12/2004 | Weingart et al. | 715/804 |
| 2004/0261038 | A1 * | 12/2004 | Ording et al. | 715/792 |
| 2004/0261039 | A1 * | 12/2004 | Pagan | 715/797 |
| 2005/0091597 | A1 | 4/2005 | Ackley | |
| 2005/0132299 | A1 * | 6/2005 | Jones et al. | 715/759 |
| 2005/0210388 | A1 | 9/2005 | Matsumoto | |
| 2005/0210410 | A1 | 9/2005 | Ohwa | |
| 2005/0223334 | A1 | 10/2005 | Guido et al. | |
| 2005/0235209 | A1 | 10/2005 | Morita | |
| 2006/0041846 | A1 * | 2/2006 | Masselle et al. | 715/793 |
| 2006/0123353 | A1 * | 6/2006 | Matthews et al. | 715/779 |

OTHER PUBLICATIONS

IBM Technical Disclosure Bulletin, "Left-Shift and Right-Shift Buttons for a Standard Window," Jun. 1, 1993, IBM Coropration, vol. No. 36, pp. 219-222.*

IBM Technical Disclosure Bulletin, "Left-Shift and Right Buttons for a Standard Window," Jun. 01, 1993, IBM Corporation, vol. No. 36, pp. 219-222.*

Shneiderman, Ben, "Treemaps for space-constrained visualization of hierarchies," Dec. 26, 1998, (updated May 18, 2004), 10 pages, printed from Internet on Nov. 2, 2004, http://www.cs.umd.edu/hcil/treemap-history/.

"Opera Software," printed from Internet on Nov. 4, 2004, http://www.opera.com/features/index.dml, 8 pages.

"Mozilla," printed from Internet on Nov. 4, 2004, http://www.mozila.org/products/firefox/tabbed-browsing.html, 3 pages.

"Safari, The fastest browser on the Mac—the best browser on any platform.", printed from Internet on Nov. 4, 2004, http://www.apple.com/safari/ , 3 pages.

"Microsoft PowerToys for Windows XP," Features described as "All-Tab Replacement," date unknown, printed from website http://www.microsoft.com/windowsp/downloads/powertoys/xppowertoys.mspx.

IronBytes, AltSwitch, Oct. 2004 (Webarchive:http://web.archive.org/web/2004 1014013718/www.ironbytes.com/index.html).

Shareup, AltSwitchReview, Sep. 2004 (http://www.shareup.com/AltSwitch-downlaod-21278.html).

SoftSea, AltSwitchReview, Oct. 2004 (http://www.softsea.com/review/AltSwitch.html).

The TaskGallery, http://research.microsoft.com/ui/TaskGallery.

"Expose -Find the window you need. Now," Apple-Mac OS X - Features - Expose, Nov. 2, 2004, 2 pp., http://www.apple.com/macosx/features/expos/

Project Looking Glass Sun Microsystems, Nov. 8, 2004, 9 pp., http://wwws.sun.com/software/looking_glass/.

WinGlance, Jul. 2004, http://winglance.useablelabs-com.qarchive.org/.

* cited by examiner

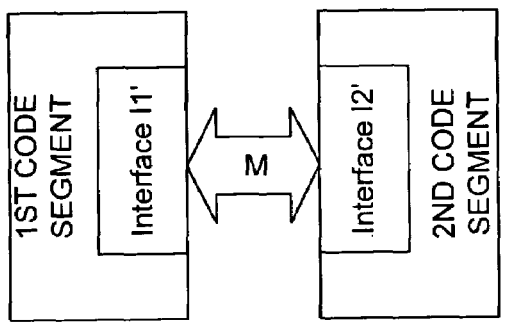
FIGURE 1F
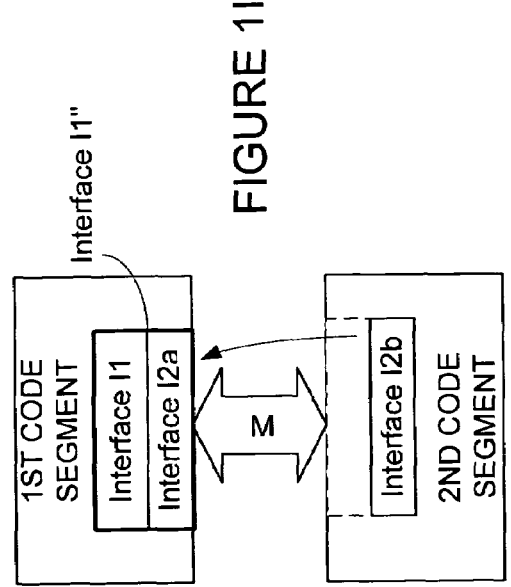
FIGURE 1G
FIGURE 1I
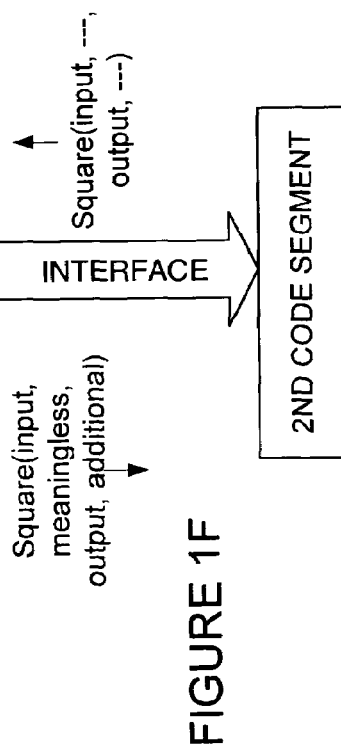
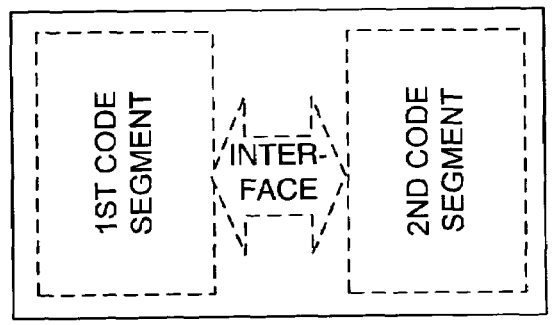
FIGURE 1H

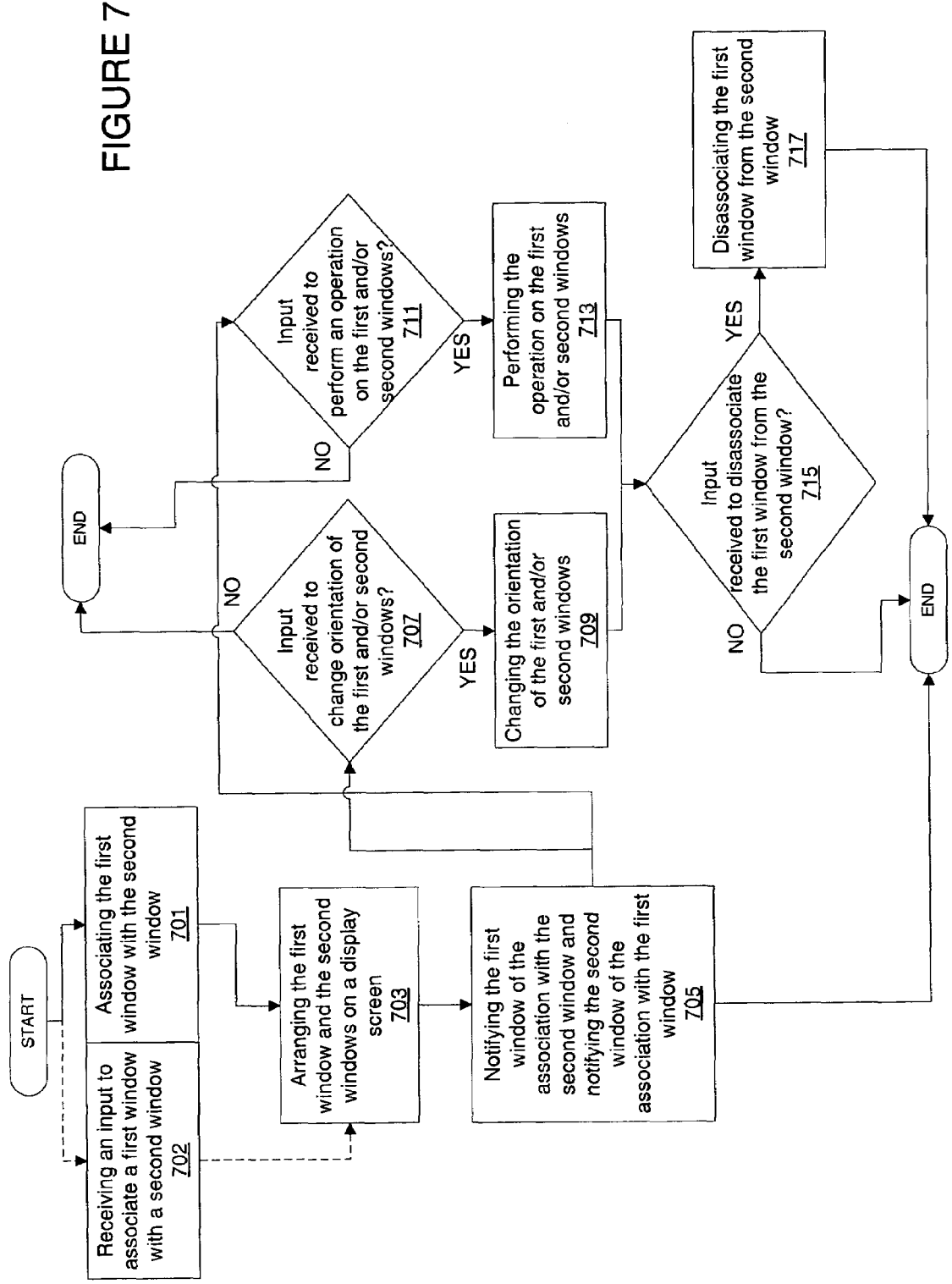

MULTIPLE WINDOW BEHAVIOR SYSTEM

FIELD OF THE INVENTION

Aspects of the present invention are directed generally to window arrangements in an operating system. More particularly, aspects of the present invention are directed to a method and system for orienting multiple windows in an operating system and allowing some intelligent behavior to exist between the windows.

BACKGROUND OF THE INVENTION

As the use of computers in both the workforce and personal life has increased, so has the desire to allow for easier use of them. Many operating systems today utilize a windows based configuration of application programs. Information is displayed on a display screen in what appears to be several sheets of paper. By interfacing with the windows, a user can access any window as if grabbing a single sheet of paper. A windows based configuration allows a user to compare and contrast content of two or more windows simultaneously.

A commonly desired orientation for windows is "two-up", where the contents of the two windows occupy as much desktop space as possible while still allowing full visual access to both windows, e.g., the windows do not overlap. However, a user must take time to arrange the windows into a desired position. Operating systems do not currently allow for multiple windows to be associated with each other so that an operation performed on one window is performed automatically on a second independent window.

One application program, Microsoft® Office Word 2003, for example, allows a user to perform a split operation on a window. The split operation allows a user to see two different segments of the same file simultaneously. Although such an application program may help to compare and contrast a single file, a need exists for a method to compare and contrast the content of two independent windows where an action performed on one window automatically performs a corresponding operation on a second window.

SUMMARY OF THE INVENTION

There is therefore a need for a method for displaying a plurality of windows on a display screen where the behavior of one of the windows automatically may affect the behavior of the other(s) windows. The method may includes steps of associating a first window with a second window, where the second window is independent of the first window, arranging the first window and the second window on a display screen, where the first window and the second window are configured to fit within a predetermined region of the display screen, and notifying an application program corresponding to the first window that the second window is associated with the first window. An application corresponding to the second window may also be notified.

Another aspect of the invention provides an indicator that may appear on the display as a target region when a user desires to associate the first and the second windows. Subsequent operations performed on the first window are performed automatically on the second window.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 1B through 1M show a general-purpose computer environment supporting one or more aspects of the present invention;

FIG. 7 is a flowchart of an illustrative example of a method for associating two windows in accordance with at least one aspect of the present invention.

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 1A:
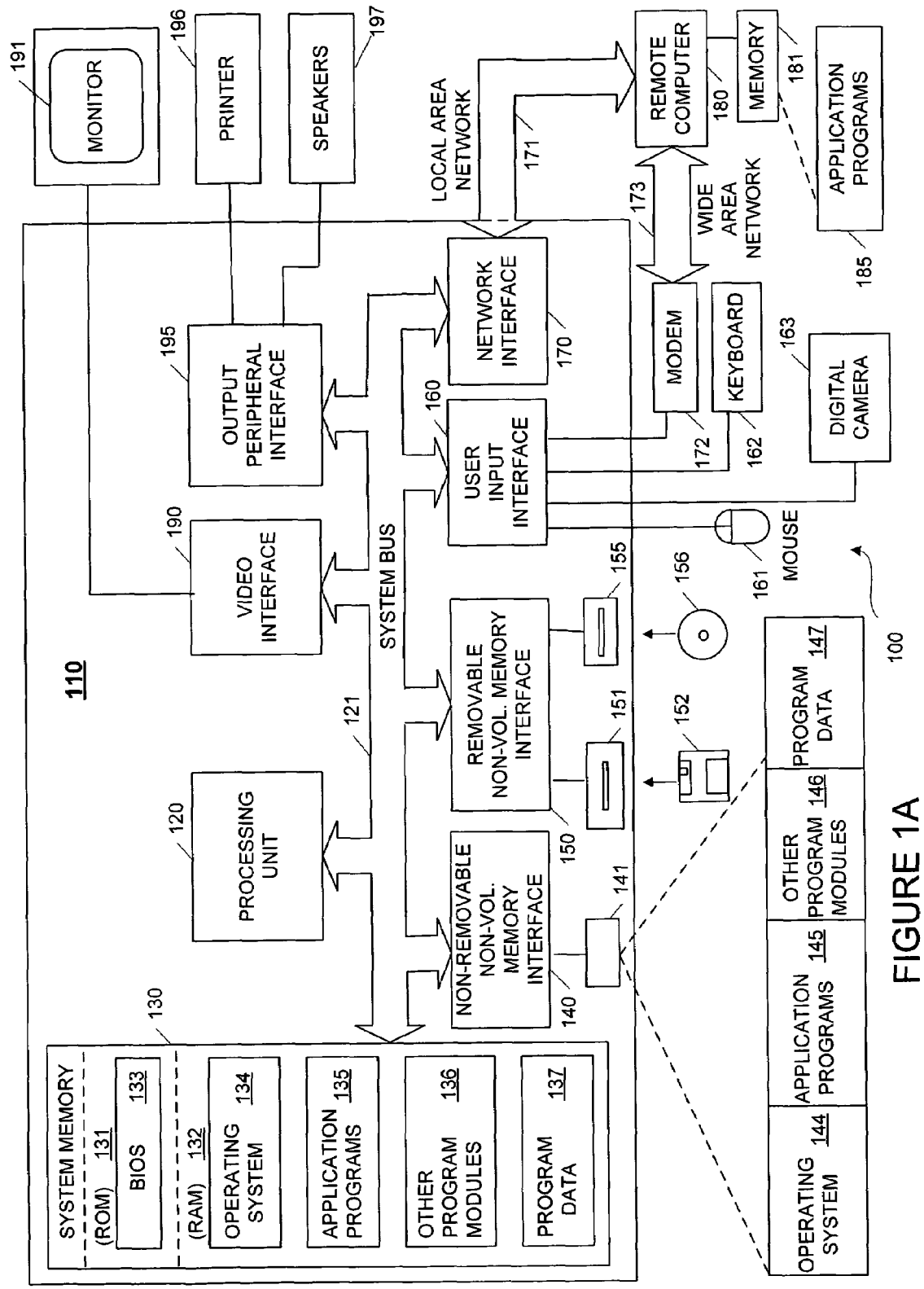
FIG. 1A illustrates a schematic diagram of a general-purpose digital computing environment in which certain aspects of the present invention may be implemented.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
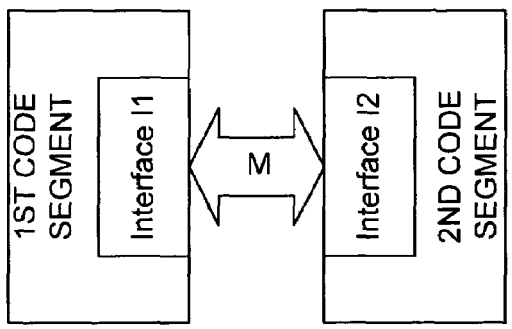
Figure 1E:
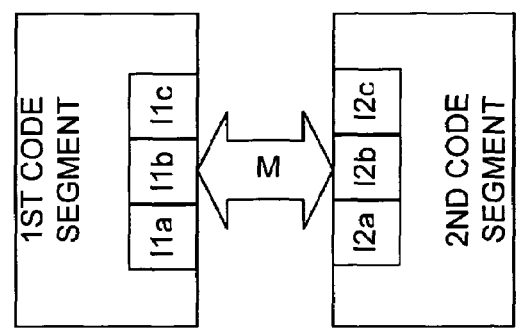
Figure 1B:
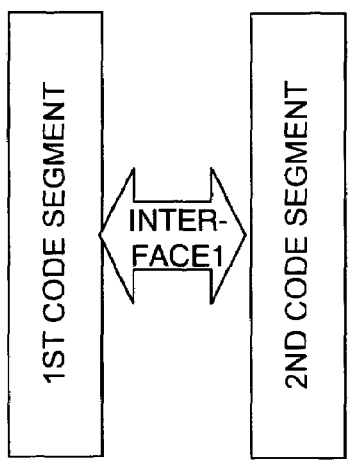

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
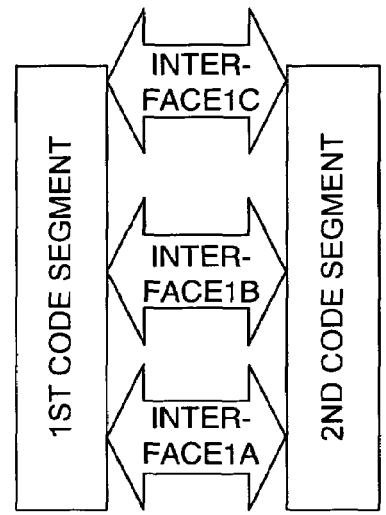

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
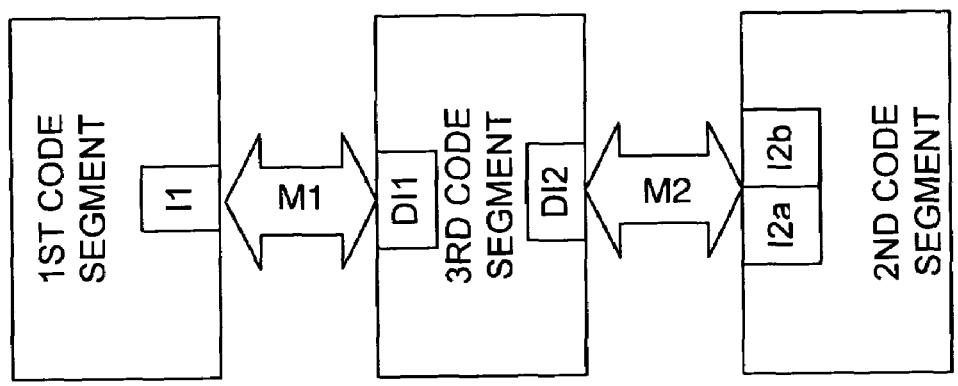
Figure 1J:
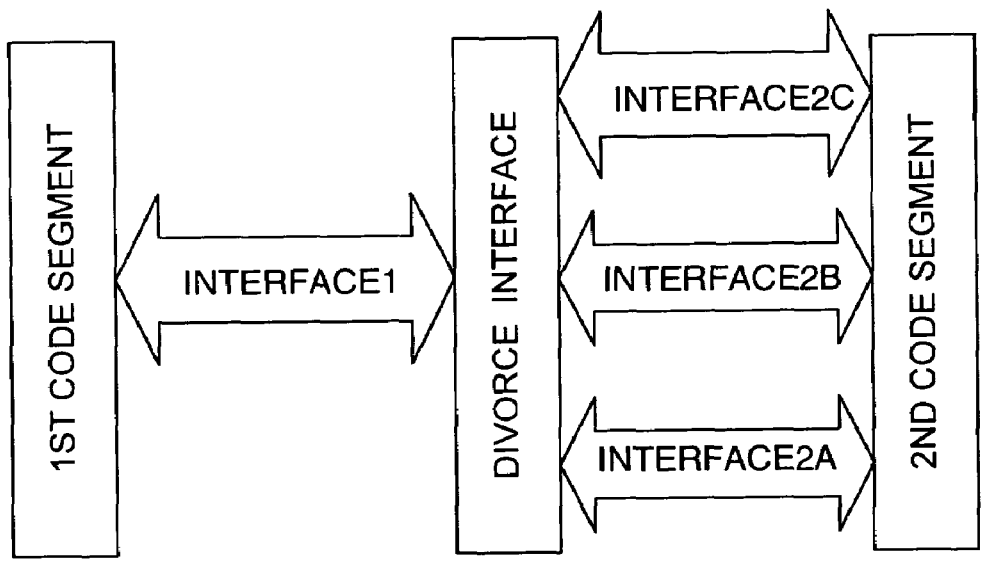

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
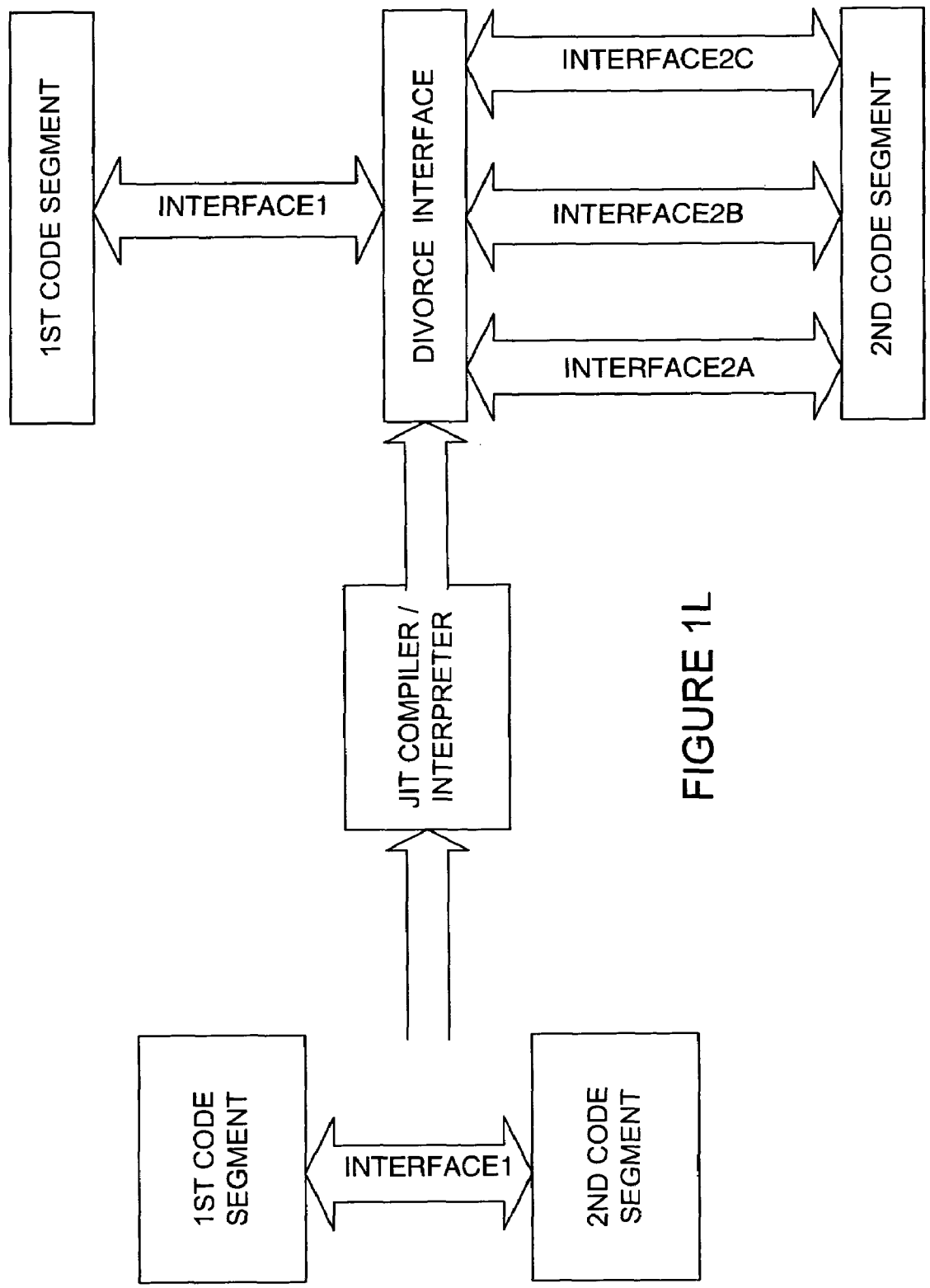
Figure 1M:
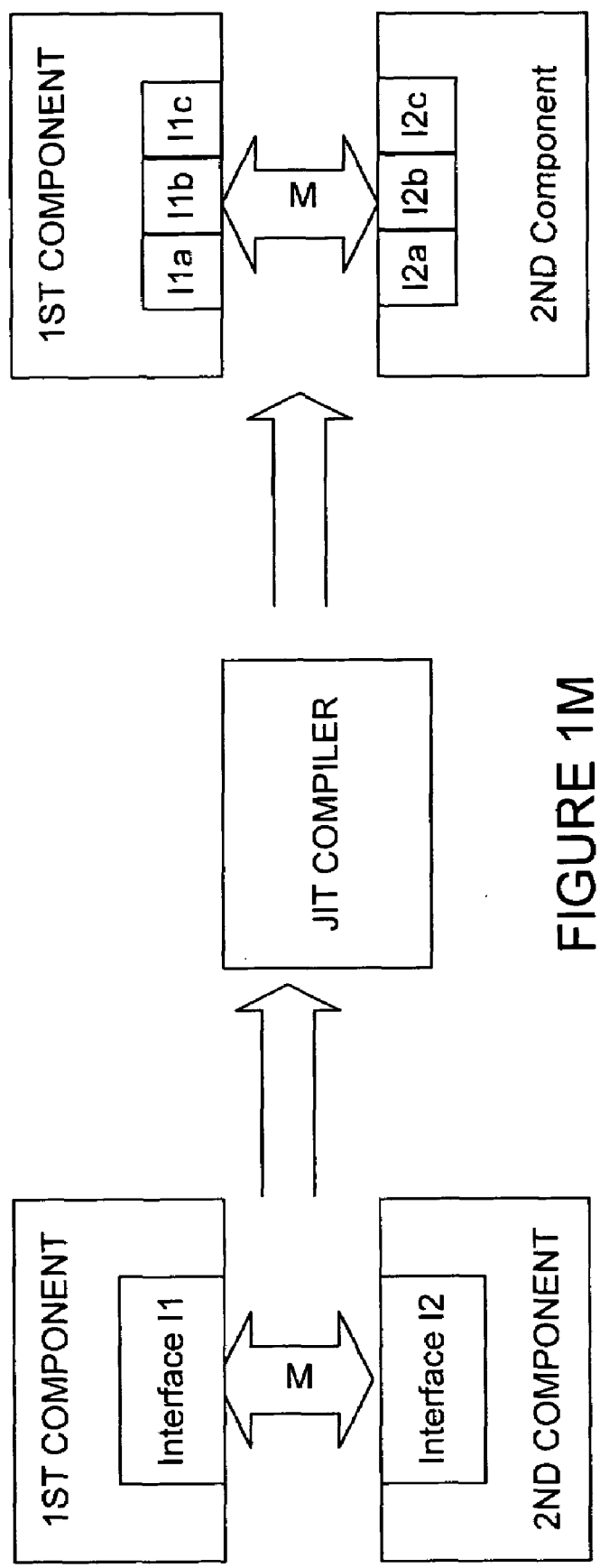

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2A:
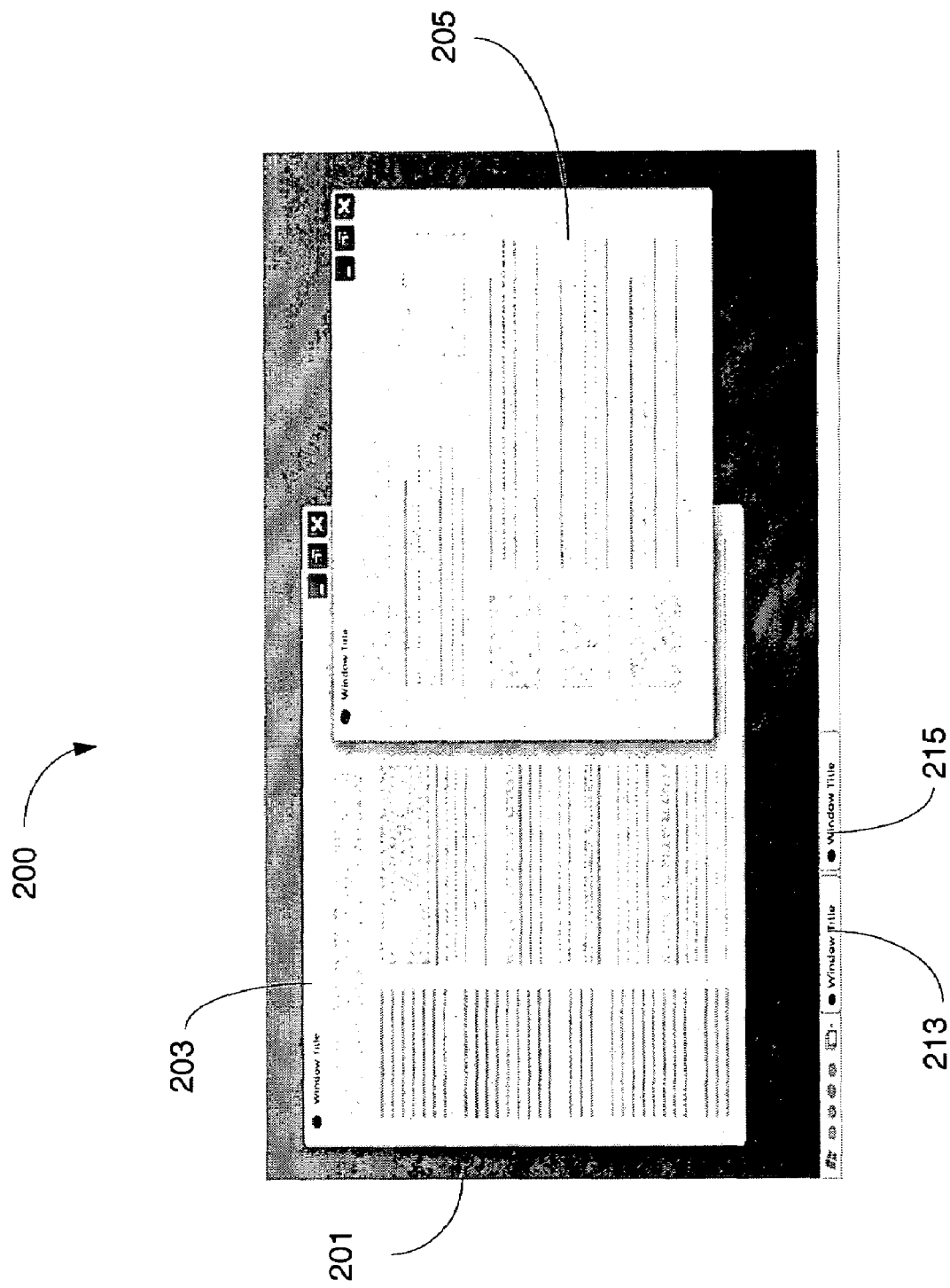
FIGS. 2A-2D illustrate a sequence of mouse pointer and window movements for associating two windows in accordance with at least one aspect of the present invention.

FIGS. 2A-2D illustrate a sequence of mouse pointer and window movements for associating two windows in accordance with at least one aspect of the present invention. As used herein, the term "associating" is defined herein to mean creating a relationship between two independent objects. FIG. 2A shows an initial example system 200 orientation of two windows 203 and 205 in a Z-order. It should be understood by those skilled in the art that the Z-order of an orientation of windows is very well known in the art. Window 205 is shown higher in the Z-order compared to window 203. Windows 203 and 205 are oriented within a desktop space 201. Desktop space 201 is an area of a display that allows for the display of windows corresponding to application programs. The taskbar at the bottom indicates which windows are currently in use, which may be visible or minimized. A taskbar is a specific implementation of an on-screen window remote control used to list and enable manipulation of windows, such as activating, moving, hiding, and minimizing. Window 203 is represented by taskbar button 213 and window 205 is represented by taskbar button 215. As shown in this example, the two windows 203 and 205 are shown open. Although only two windows are shown, it should be understood that more windows may be open. As used herein, the term "orientation" is defined herein to include adjustments to the visual appearance of a window or group of windows, such as the size or shape of the window and a shared common border between or around at least two windows.

Figure 2B:
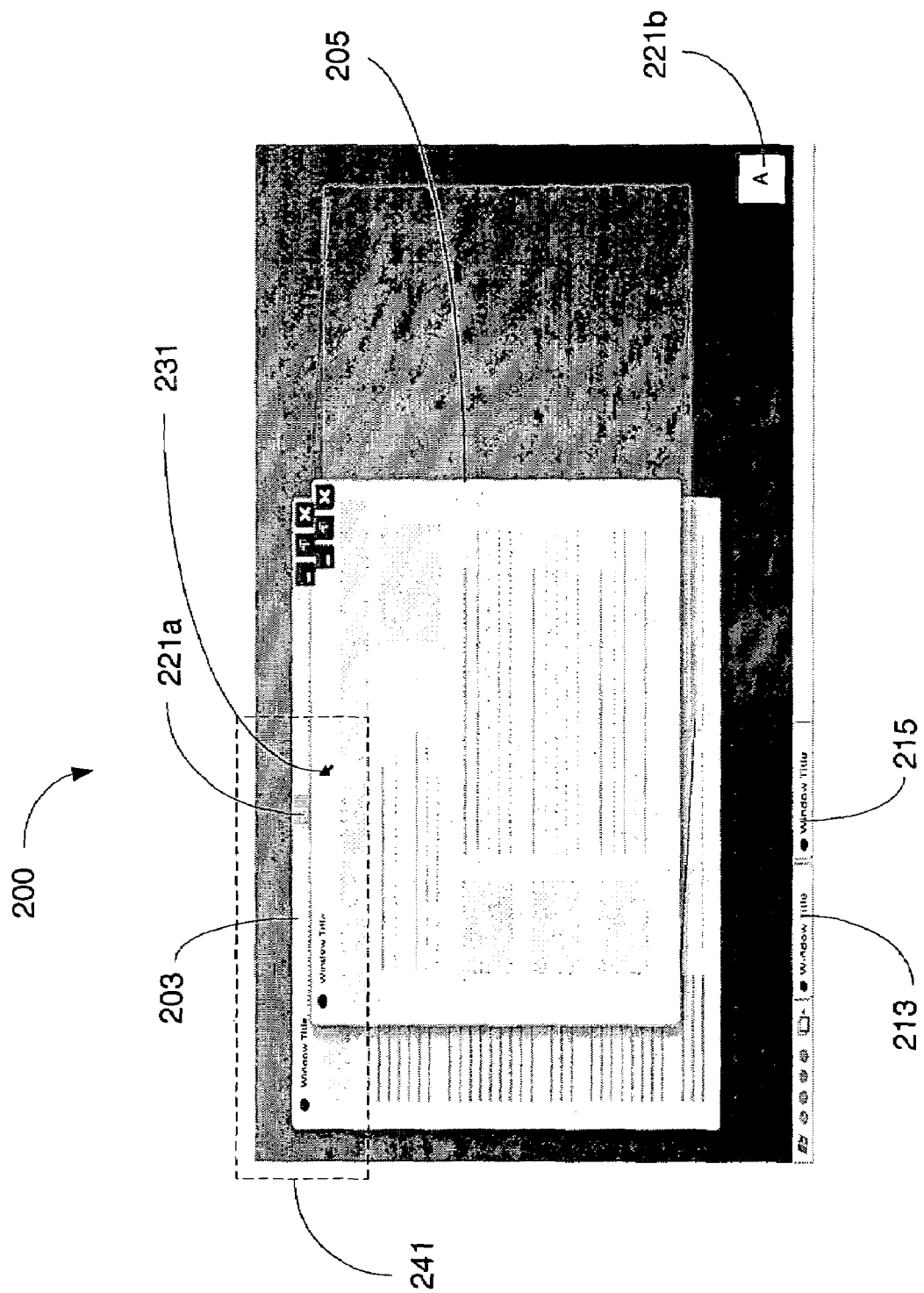
Figure 2C:
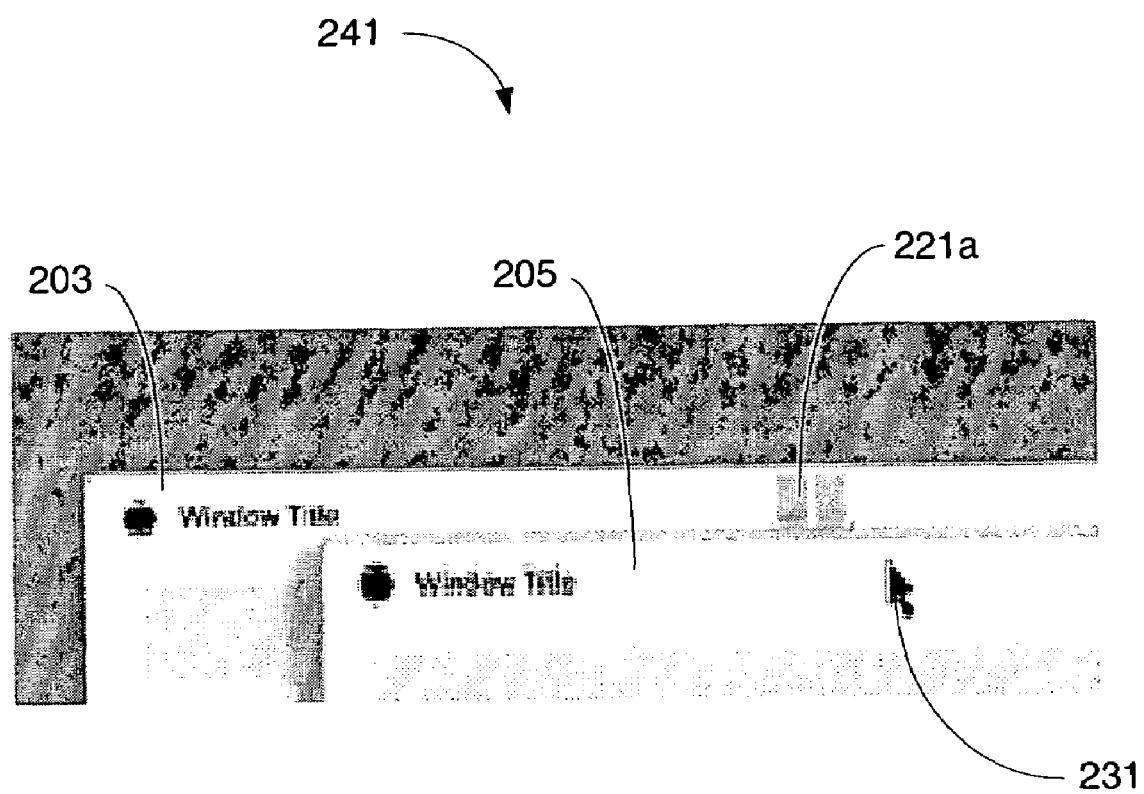

As shown in FIG. 2B, a user has begun to move the topmost window, window 205, by dragging its title bar with a mouse pointer 231. In this example, a target region 221a has appeared over a predefined area of a region of the display. As shown by the example in FIG. 2B, the target region 221a appears within the title bar of window 203. Target region 221a may appear when the mouse pointer and/or a portion of another window is/are within the predefined area. For example, as shown in FIG. 2A, target region 221a does not exists; however, when the mouse pointer 231 is within a predefined distance of the target region 212a, the target region 221a appears on the display. Alternatively, target region 221b may be a predefined location point on the display where two windows can be dragged and dropped to be associated with each other. The predefined location of the target region 221b may appear when a window and/or mouse pointer is/are close to it or it may always be present in a predefined location. FIG. 2C is an illustrative example of a portion 241 of the display system 200 from FIG. 2B in an exploded view format.

Figure 2D:
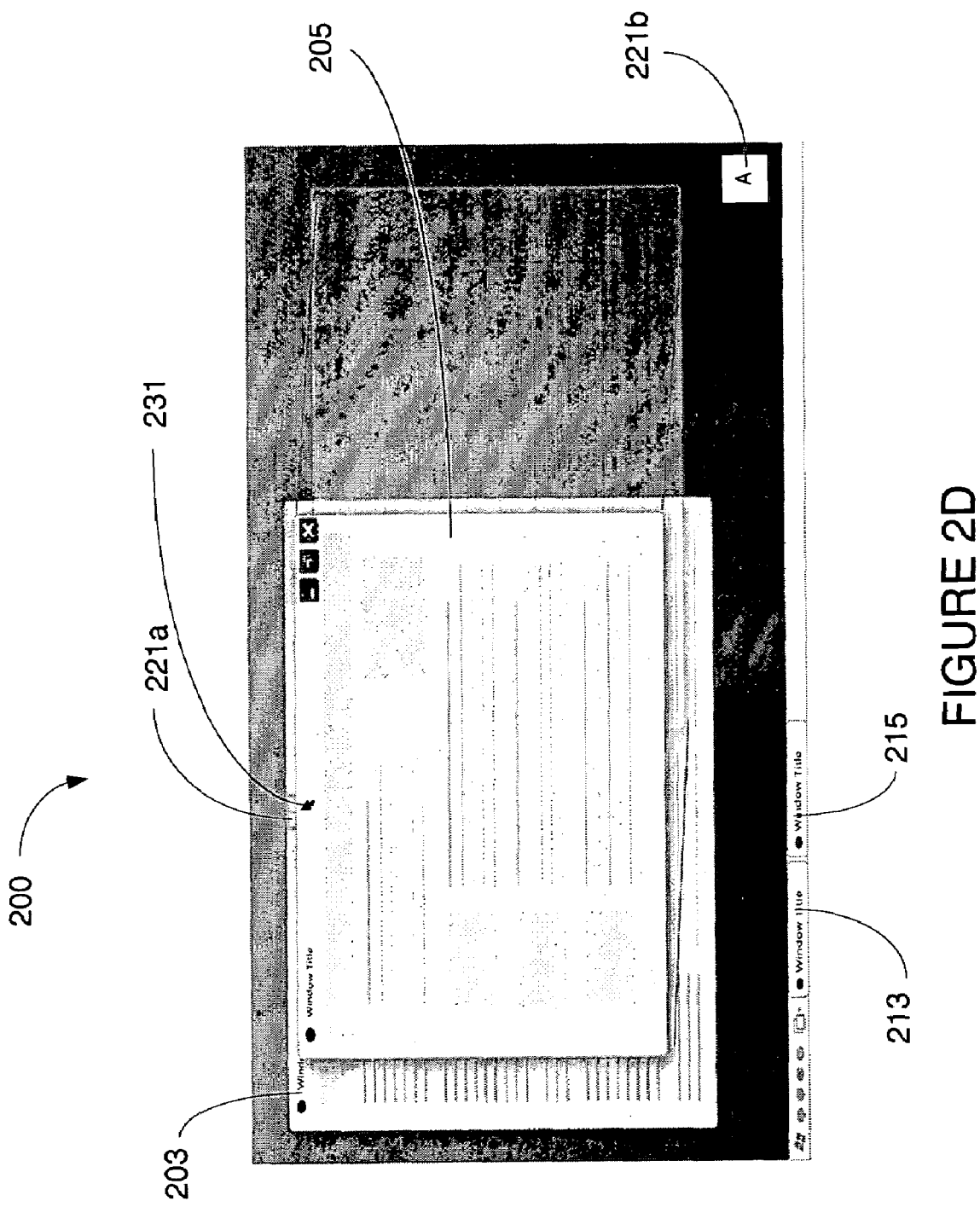

As shown in the example of FIG. 2D, a user has dragged window 205 over the target region 221a. Upon release/drop of window 205 over the target region 221a, windows 203 and 205 are arranged and associated with each other. It should be understood by those skilled in the art that target region 221a may be a type of visual and/or audio indicator that prompts the user as to the location for associating the windows. In accordance with at least one aspect of the present invention, the association of the windows may be performed by dragging and dropping window 203 into a target region 221b and then dragging and dropping window 205 into the target region 221b. In still another embodiment, a user can perform a single and/or sequence of key/button strokes to associate two windows 203 and 205. For example, a user can press a predefined sequence of key strokes on a keyboard to associate windows 203 and 205. Upon activation of the key strokes window 203 may be associated with window 205. In yet another embodiment of the present invention, a user can click and drag taskbar button 213 and drag it to taskbar button 215 in order to initiate the process for associating window 203 and window 205. It should be understood that the present invention is not so limited to the examples included herein.

Figure 3A:
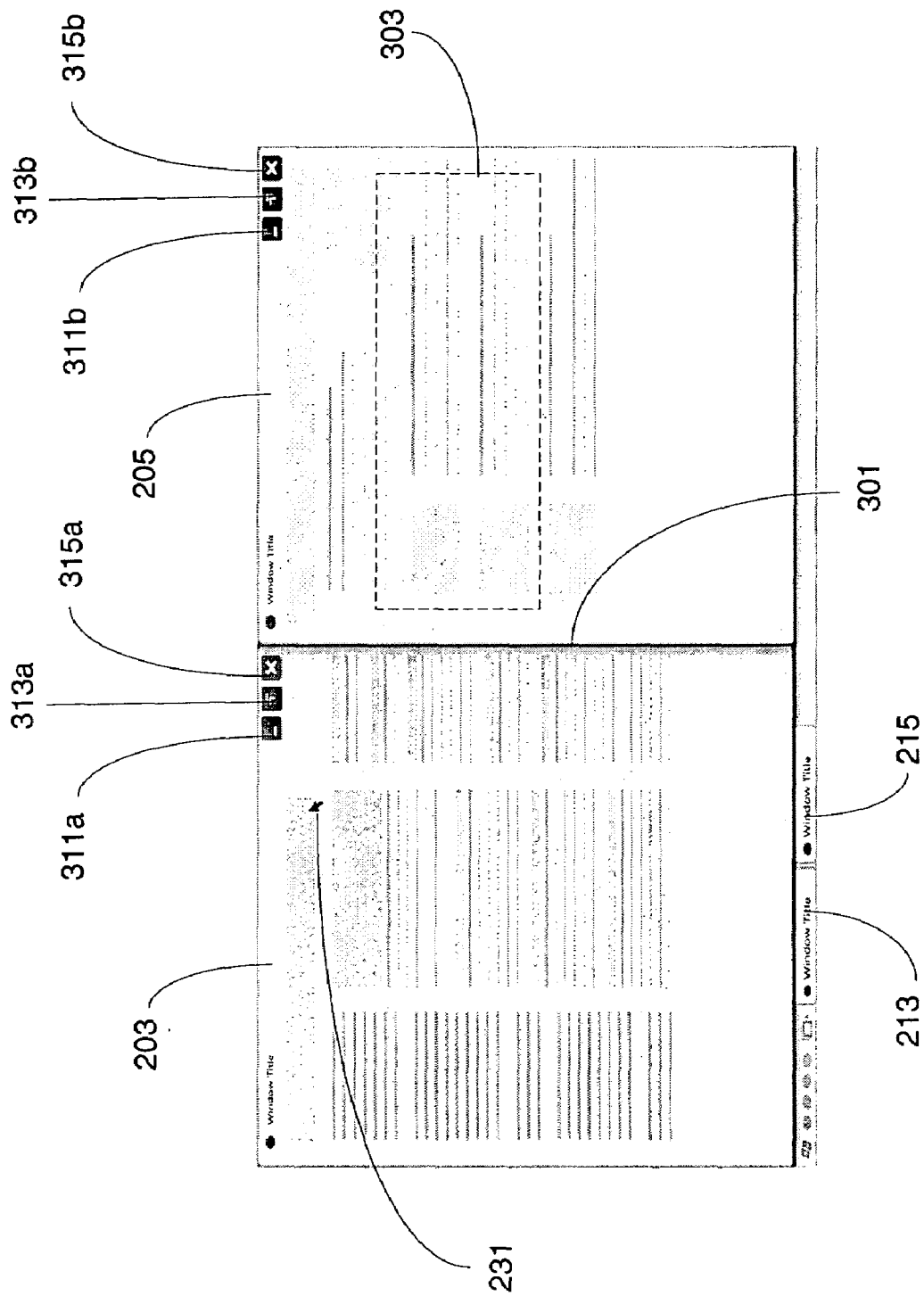
FIGS. 3A-3B illustrate examples of associated windows being displayed in accordance with at least one aspect of the present invention.
Figure 3B:
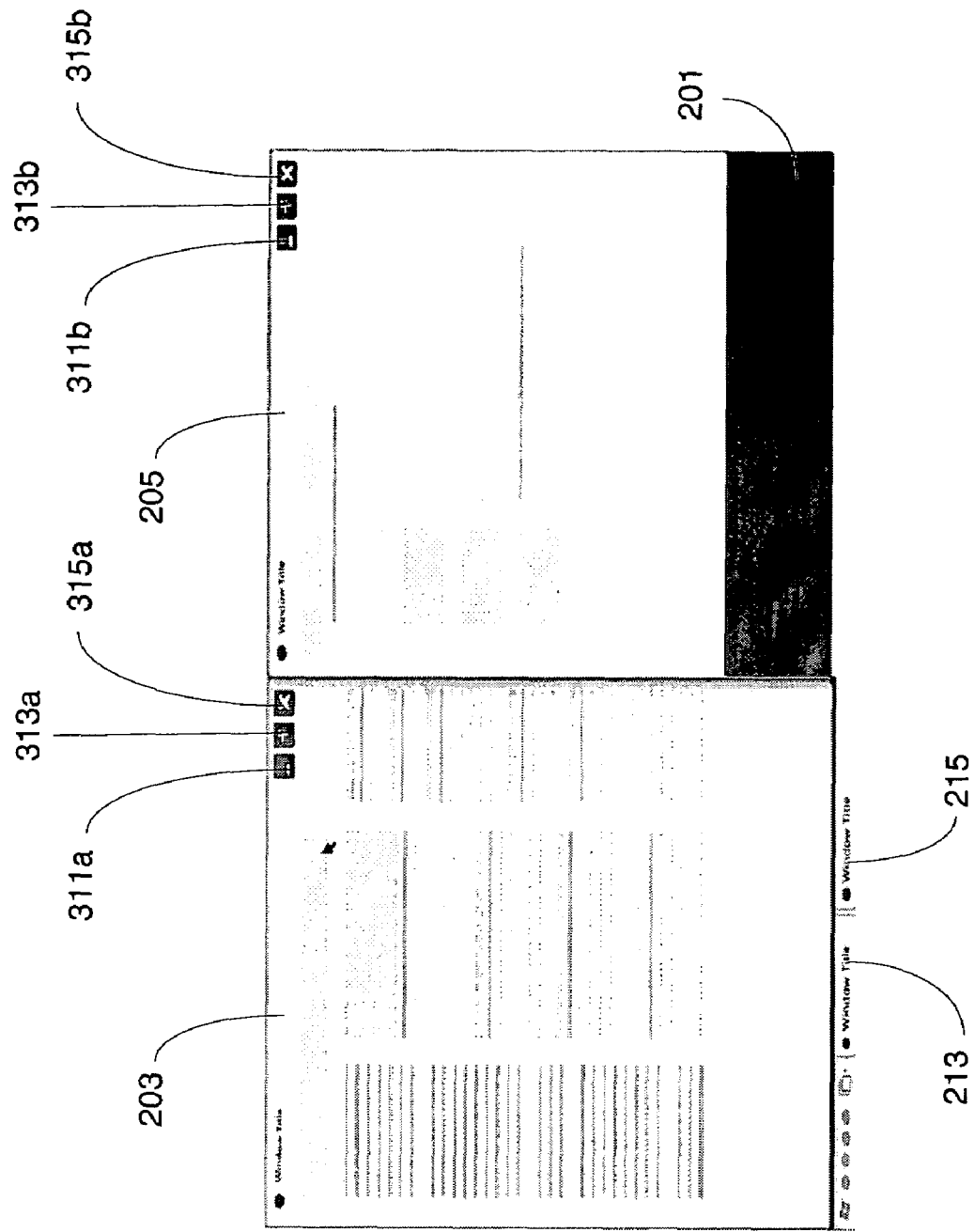

FIGS. 3A-3B illustrate examples of associated windows being displayed in accordance with at least one aspect of the present invention. In FIG. 3A, window 203 has been associated with window 205. The two windows 203 and 205 have been arranged side-by-side on the display to occupy all of the available desktop space 201. As shown, each of window 203 and window 205 occupies approximately 50% of the desktop space 201. Although this example shows use of the entire available desktop space, it should be understood that the present invention may be utilized within a smaller or larger region of the display and is not so limited. Still further, it should be understood that a multi-monitor configuration, such as two monitors corresponding to the entire display area, may be utilized where each monitor displays one of the windows.

Upon activation of the association of window 203 to window 205, a notification message may be sent to one or each application program corresponding to window 203 and window 205 to inform the other that each is now associated with the other. In one example, if window 203 were behind any other window when the association was initiated, window 203 would be brought to the top of the Z-order. The application program associated with window 203 may be a different application program or the same application program corresponding to window 205.

FIG. 3A shows window 203 and window 205 as sharing a common border 301. As described below, a change to the orientation of one window 203 may automatically initiate a change to the orientation of the second window 205. Window 203 is shown to include three mode selection buttons 311a, 313a, and 315a. Similarly, window 205 is shown to include three mode selection buttons 311b, 313b, and 315b. Mode selection button 311a may be an operation to minimize window 203. Mode selection button 313a may be an operation to restore window 203. Mode selection button 315a may be an operation to close window 203. Similar operations may be configured for mode selection buttons 311b, 313b, and 315b.

Upon activation of a mode selection button, such as mode selection button 311a, window 203 has an operation performed on it. In this case, a user may select to minimize window 203 upon depression of mode selection button 311a. In response, system 200 automatically performs the same operation on window 205 as the two windows, 203 and 205, are associated with each other. Similarly, an operation and/or orientation change performed on window 205 automatically may trigger a corresponding operation on window 203. As such, performing an operation on a first window may include changing an orientation of the first window based upon an activation of a mode selection interface, such as mode selection button 311a.

Although mode selection interfaces, buttons and common borders are described in these examples, it should be understood by those skilled in the art that other types of operations and/or orientation changes may be performed on the windows and that the present invention is not so limited to the examples herein. For example, a user may choose to perform an operation from a drop down menu for window 203, such as to save the content of the window 203. In such a case, the system 200 automatically may save the content of window 205 as well. In other embodiments, the system 200 may be configured to allow for certain operations to be performed automatically, such as maximizing and minimizing the windows, while not performing other operations automatically. For example, minimizing window 203 may automatically minimize window 205 as well, while saving the contents of window 203 may not save automatically the contents of window 205.

Although not shown in FIG. 3A, portion(s) 303 or the entire content of one window 205 may be modified when arranging the orientation of the associated windows 203 and 205. For example, if window 203 and window 205 each contain a different draft of the same document, one may be in Times New Roman style font with a size of 10 and the other may be in a Courier style font with a size of 12. When arranged in a side-by-side comparison, the user may have to perform additional steps for changing the format of the content of one to more closely match the format of the content of the other. As such, in accordance with at least one aspect of the present invention, content of one or both windows may be modified during the association process.

FIG. 3B is another example of how the two windows 203 and 205 may be oriented with reference to each other. In this example, windows 203 and 205 may be arranged to fit a desktop space 201 in its entirety horizontally, but not vertically. Such an example may be a case in which the content of window 203 may be printed to standard 8½×11 paper while the content in window 205 may be printed to standard A4 paper. Alternatively, a user may have changed the bottom edge of window 205 after the two windows were associated with each other.

Figure 4:
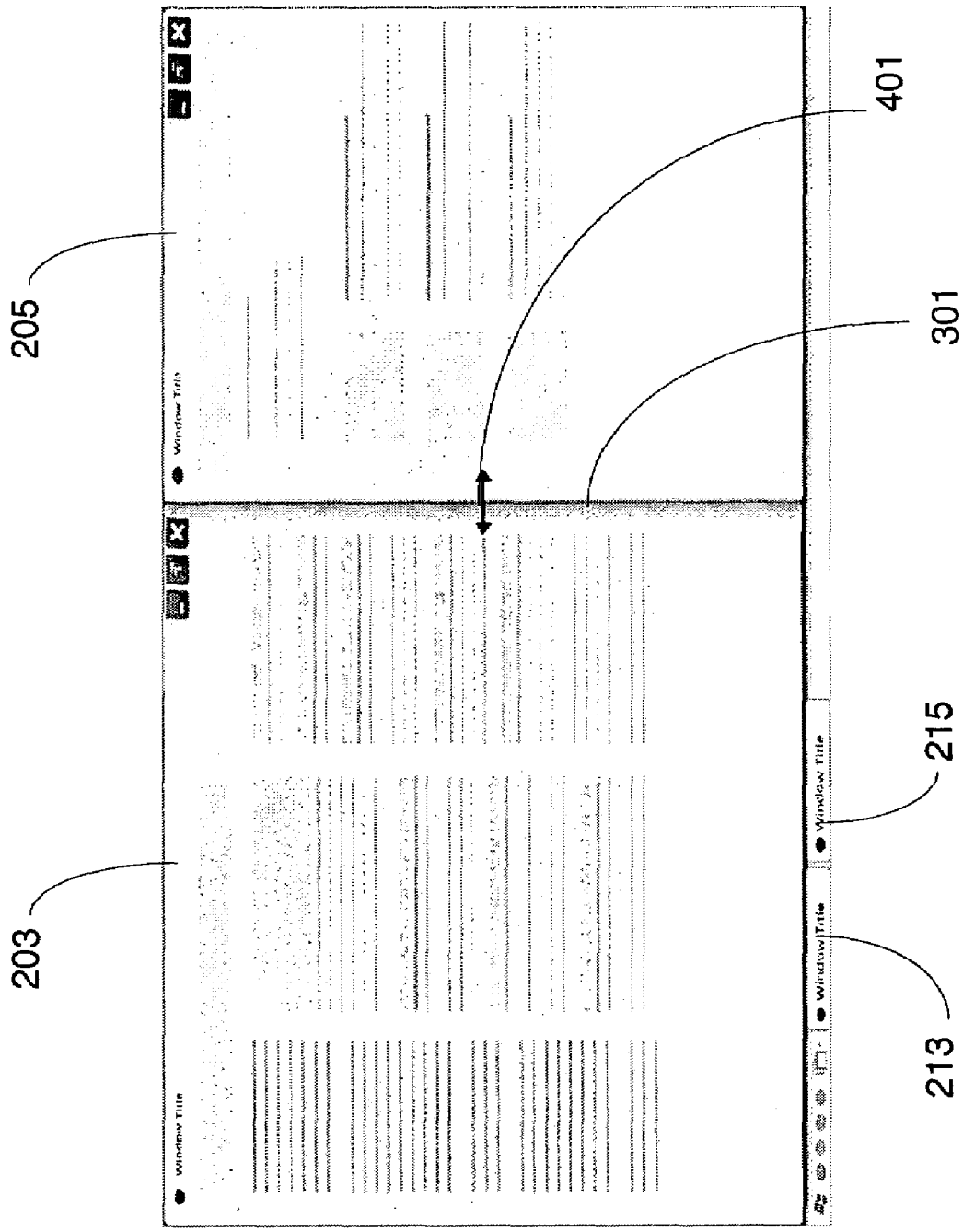
FIG. 4 illustrates an example of associated windows being displayed with a resizing operation being performed on the associated windows in accordance with at least one aspect of the present invention.

FIG. 4 illustrates an example of associated windows being displayed with a resizing operation being performed on the associated windows in accordance with at least one aspect of the present invention. As shown in FIG. 4, a user can change the orientation of the two windows 203 and 205 by moving 401 the common border 301. In this example, the width of window 203 has been increased by the movement 401 of the common border 301 to the right. The width of window 205 has been modified automatically in response to the movement 401 as well. Although the two windows are independent of each other, movement 401 of the common border does not overlap the two windows; they remain in full visual access. As used herein, independent windows are windows that do not share common content, such as the case for splitting windows as used within Microsoft® Office Word 2003 by Microsoft® Corporation of Redmond, Wash.

Figure 5:
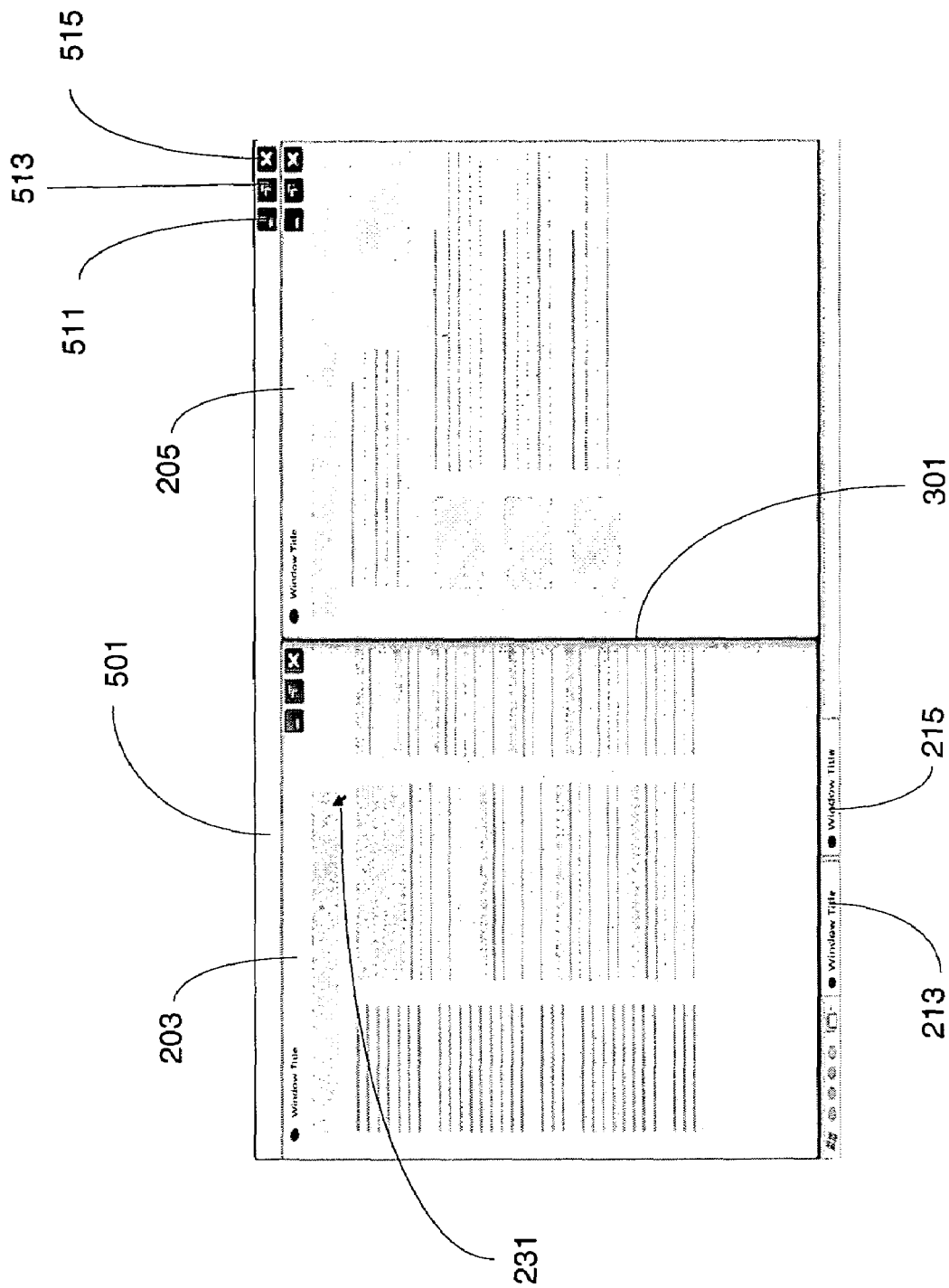
FIGS. 5, 6A and 6B illustrate examples of associated windows being displayed with a common window in accordance with at least one aspect of the present invention.
Figure 6A:
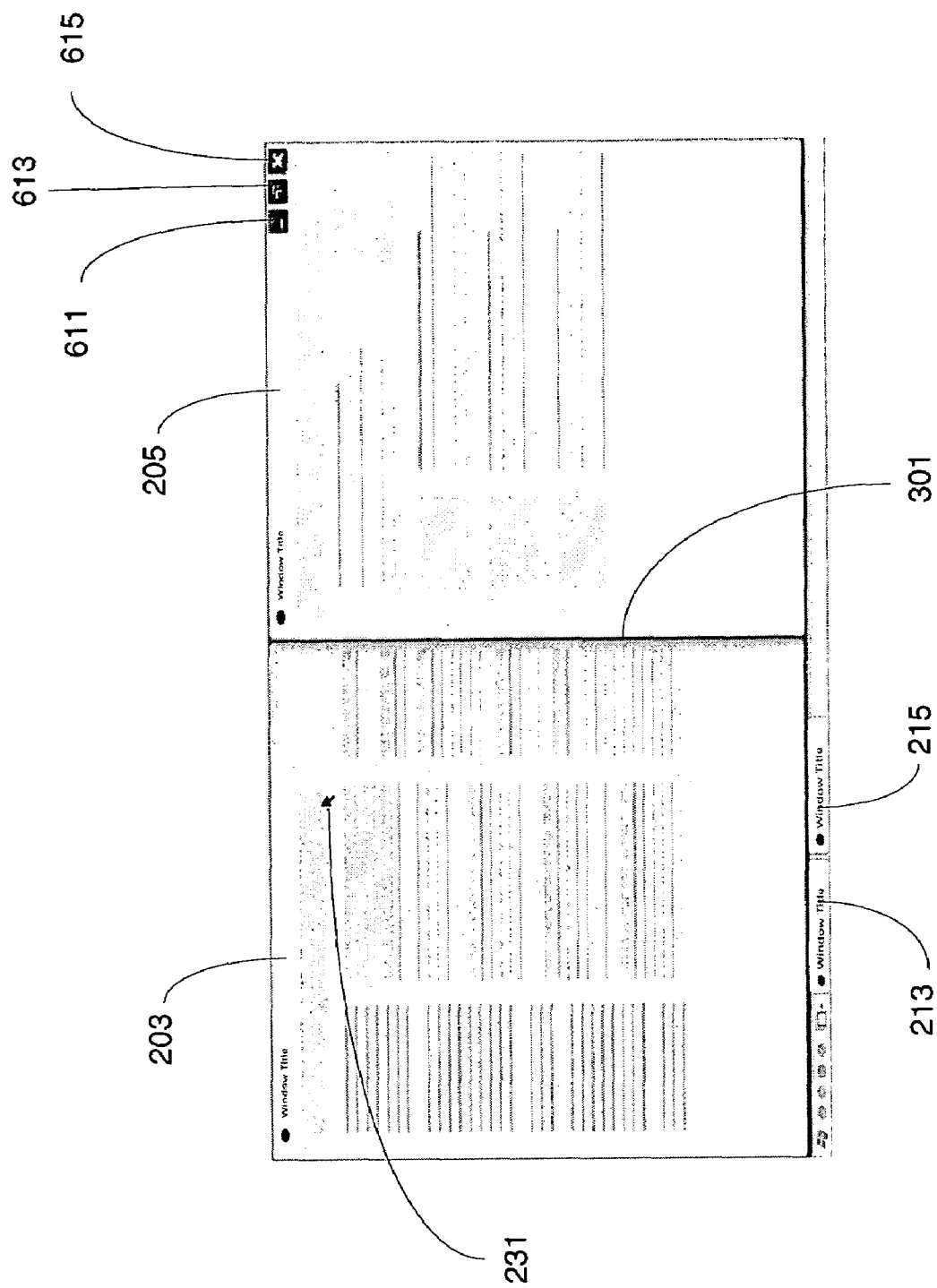
Figure 6B:
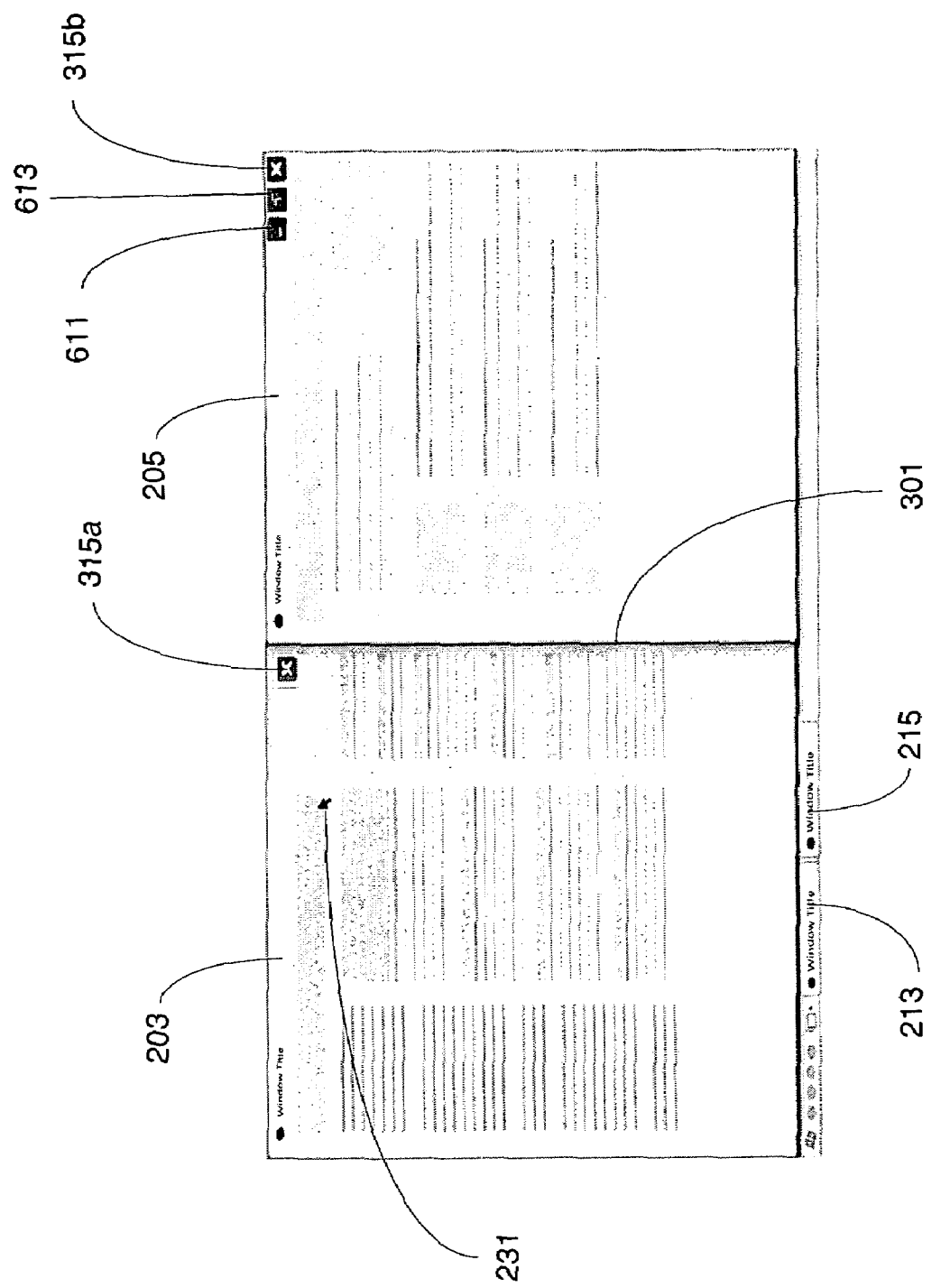

FIGS. 5, 6A and 6B illustrate examples of associated windows being displayed with a common window in accordance with at least one aspect of the present invention. FIG. 5 shows and illustrative example in which a common window 501 has been established between the windows 203 and 205. In this case, window 203 and window 205 are each within a common window 501. As shown, common window 501 includes three mode selection buttons 511, 513, and 515. Mode selection buttons 511, 513, and 515 may be configured to operate in a manner similar to mode selections buttons 311, 313, and 315. In the example shown in FIG. 5, depression of a mode selection button, such as mode selection button 515, will close the common window 501, thus closing window 203 and window 205 since both are included within common window 501. Again, it should be realized by those skilled in the art that the operational buttons and functions associated with the common window 501 are merely illustrative and that other operations may be included and/or performed on the common window 501.

FIG. 6A illustrates an example in which a common window exists between the two windows 203 and 205. In this case, the common window does not have a separate title bar. In this example, the mode selection buttons 311, 313, and 315 have been substituted with new mode selection buttons 611, 613, and 615. For this example, a depression of a mode selection button will perform the operation on each of windows 203 and 205. In an alternative embodiment, certain operations, functions, and/or buttons may be configured to be common, while other may be configured to be independent to a respective window. For example, in FIG. 6B, mode selection buttons 611 and 613 are common to both windows 203 and 205, while mode selection button 315a only performs an operation on window 203 and mode selection button 315b only performs an operation on window 205.

FIG. 7 is a flowchart of an illustrative example of a method for associating two windows in accordance with at least one aspect of the present invention. The process starts at step 701 where a first window is associated with a second window. As part of the process of associating the two windows, an input may be received at step 702 to request and association of the first and second windows. The first and second windows may be independent of each other. The process moves to step 703 where the first and second windows are arranged on a display screen. At step 705, a notification message is sent to an application program corresponding to the first window informing the first window that it is associated with the second window. In addition, a notification message also may be sent to an application program corresponding to the second window informing the second window that it is associated with the first window. With the two windows associated with, arranged beside, and notified of the other, the process may end.

The process also may continue to step 707 where a determination is made as to whether an input has been received to change the orientation of the first and/or the second windows. For example, the input may be a request to move a common border shared between the first window and the second window. If an input has not been received, the process ends. If an input has been received at step 707, the process moves to step 709 where the orientation of the first and/or the second window is changed in accordance with the request. For example, by moving the common border of the windows, both the orientations of the first window and the second window are modified. Alternatively and/or concurrently, from step 705, the process may proceed to step 711 where a determination is made as to whether an input has been received to perform an operation on the first and/or the second windows. One type of operation may include an operation to scroll through the content of the first window. If an input has not been received, the process ends. If an input has been received at step 711, the process moves to step 713 where the operation is performed on the first and/or the second windows. For example, the input may be a request to save the content within the first window. In such a case, if the operation is to be performed common to both windows, the contents of both the first and the second windows are saved. Alternatively, if the operation is independent of the other window, the operation is only performed on the one window to which the operation was directed.

From either step 709 or 713, the process moves to step 715 where a determination is made as to whether an input has been received to disassociate the first and second windows. For example, a user may decide that she no longer desires to have the first and second window share common operations. If an input has not been received, the process ends. If an input has been received at step 715, the process moves to step 717 where the first window is disassociated from the second window and the process ends. Various methods may be used to disassociate the first and second windows. For example, a mouse pointer may be used to drag one of the windows away form the other. Another example may be resizing and/or minimizing one of the windows. Resizing and minimizing may be done with the windows grouped together or, in the alternative, such functions may be used to disassociate the two windows.

Figure 8:
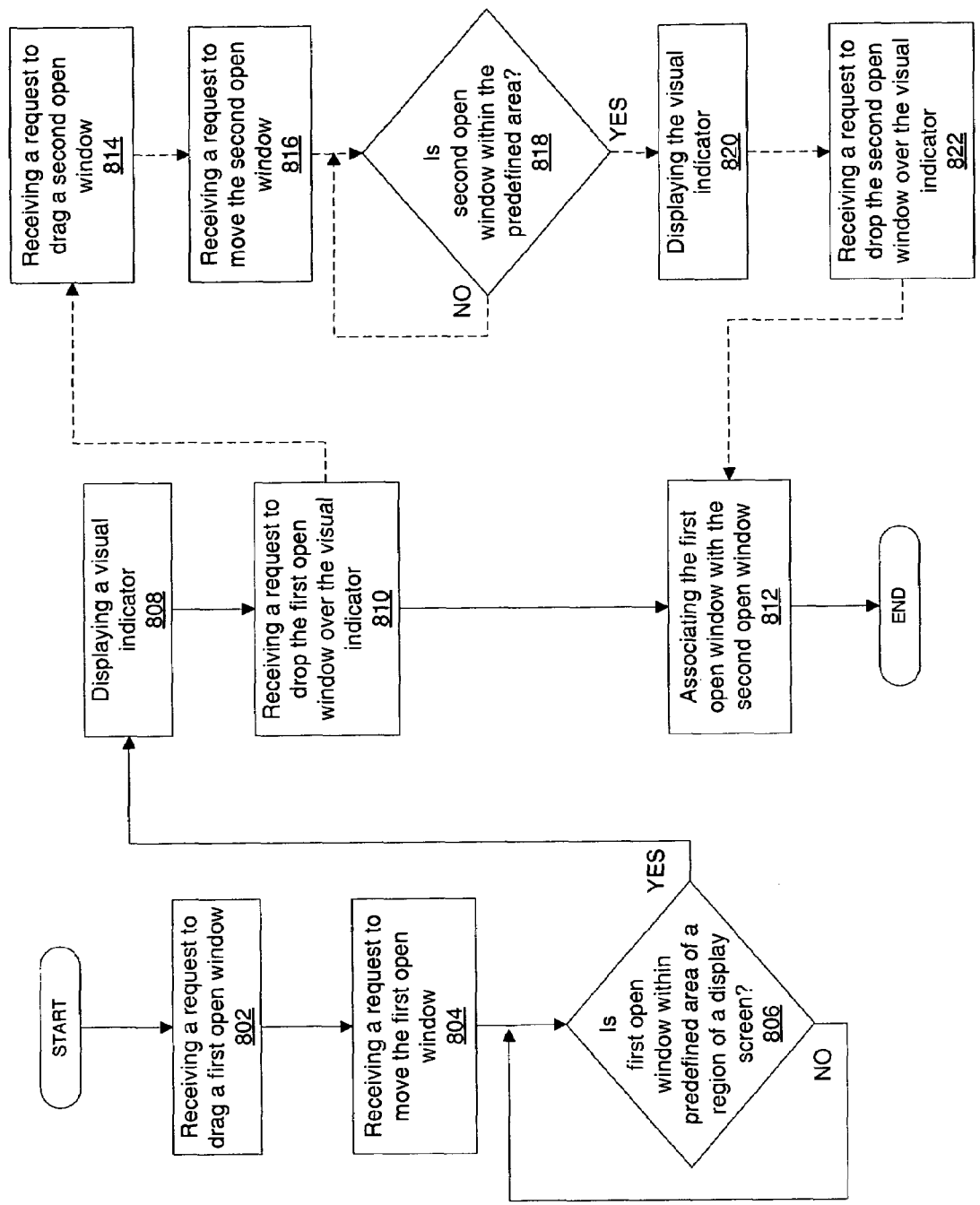
FIG. 8 is a flowchart of an illustrative example of a method for associating two windows using a visual indicator in accordance with at least one aspect of the present invention.

FIG. 8 is a flowchart of an illustrative example of a method for associating two windows using a visual indicator in accordance with at least one aspect of the present invention. Such a request may originate in the form of a click and hold of an electronic input device by a user. The process starts at step 802 where a request to drag a first open window is received by the system. At step 804, a request to move the first open window is received by the system. Such as request may originate in the form of a movement of an electronic input device, such as an electronic mouse. The process then moves to step 806.

At step 806, a determination is made as to whether the first open window is within a predefined area of a region of a display screen. For example, the predetermined region may be within an inch of the target region and the system may determine that the user has dragged the first open window within an inch of the target region. In another example, the predetermined region may be a fixed target location on a display and the system may determine that the user has dragged the first open window to over the fixed target location. If the first open window is not within the predefined area, the process returns back to step 806. If the first open window is within the predefined area, the process moves to step 808 where a visual indicator is displayed. It should be noted that an audio indicator may also or alternatively be used in the place of the visual indicator.

At step 810, a request to drop the first window over the visual indicator is received. Such a request may originate in the form of a user releasing a clicked and held electronic input device button from step 802. From step 810, the process may proceed to step 812 where the first open window and a second open window are associated with each other. Alternatively, from step 810, the process may move to step 814 where a request to drag the second open window is received by the system. At step 816, a request to move the second open window is received by the system. Such a request may originate in the form of a movement of an electronic input device, such as an electronic mouse. The process then moves to step 818.

At step 818, a determination is made as to whether the second open window is within a predefined area of a region of a display screen. If not, the process returns back to step 818. If the second open window is within a predefined area, the process moves to step 820 where a visual indicator is displayed. At step 822, a request to drop the second window over the visual indicator is received. Such a request may originate in the form of a user releasing a clicked and held electronic input device button from step 814. From step 822, the process may proceed to step 812 where the fist open window and the second open window are associated with each other.

With respect to an application programming interface (API), various aspects of the present invention may be performed by an API. For example, public APIs may interface with an operating system to allow an operating system to provide the various features of the present invention. In one embodiment, a software architecture for processing data representative of associated windows may include a component configured to associate a first open window and a second open window into a common open window and an application program interface to access the component. An API may receive a request to group two windows into a common window, access the necessary function(s) to perform the operation, and then send the results back to an operating system. The operating system may use the data provided from the API to perform the various features of the present invention.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A computer implemented method for displaying a plurality of windows on a display screen, the method comprising steps of:
    associating a first window with at least one second window, said at least one second window being independent of the first window, responsive to an input corresponding to a movement of the at least one second window over a target location of the first window, and wherein the target location is an object that appears on the first window when the at least one second window is dragged within a predefined area of the first window;
    responsive to associating the first window with the at least one second window, arranging the first window and the at least one second window on a display screen, the first window and the at least one second window being configured to fit within a predetermined region of the display screen; and
    notifying an application program corresponding to the first window that the at least one second window is associated with the first window.

2. The method of claim 1, further comprising a step of automatically changing the orientation of the at least one second window responsive to a step of changing the orientation of the first window.

3. The method of claim 1, further comprising a step of performing an operation on the first window.

4. The method of claim 1, further comprising a step of automatically performing a corresponding operation on the at least one second window responsive to a step of performing an operation on the first window.

5. The method of claim 1, further comprising a step of changing an orientation of the first window based upon an activation of a mode selection interface.

6. The method of claim 1, further comprising a step of notifying the application program corresponding to the first window that the at least one second window is no longer associated with the first window.

7. The method of claim 1, wherein the step of associating includes a step of framing the first window and the at least one second window in a common window.

8. The method of claim 1, further comprising a step of notifying an application program corresponding to the second window that the first window is associated with the at least one second window.

9. The method of claim 8, wherein the application program corresponding to the first window and the application corresponding to the at least one second window are the same application program.

10. A method of associating multiple windows into a common window on a display screen, the method comprising steps of:
    receiving a first input corresponding to a request to move a first open window by a mouse pointer;
    determining that the first open window has been moved within a predefined area of a region of a display screen;
    responsive to determining that the first open window has been moved within the predefined area, displaying an indicator corresponding to a target region for associating windows;

receiving a second input corresponding to a request to drop the first open window by the mouse pointer over the indicator; and associating the first open window with a second open window into a common open window.

11. The method of claim 10, wherein the indicator includes a visual indicator displayed on a portion of the second open window.

12. The method of claim 10, further comprising a step of receiving a third input corresponding to a request to perform an operation on the common window, wherein the operation performed on the common window is performed on the first open window and the second open window.

13. The method of claim 10, further comprising a step of receiving a third input corresponding to a request to disassociate the first open window from the second open window.

14. The method of claim 10, wherein the indicator includes a visual indicator displayed only when the first window has been moved within the predefined area.

15. A computer-readable storage medium comprising a series of computer-executable instructions for displaying a plurality of windows on a display screen, the instructions performing steps of:

sending an instruction to display a first window corresponding to a first application program and a second window corresponding to a second application program into a predetermined arrangement;

associating the first window with the second window responsive to an input corresponding to a movement of the second window over an indicator that corresponds to a target region for associating windows, wherein the indicator is an object that appears when the second window is dragged within a predefined area of a region of a display screen;

sending a first notification message to the first application program that the second window corresponding to the second application program is associated with the first window;

sending a second notification message to the second application program that the first window corresponding to the first application program is associated with the second window; and sending an instruction to automatically modify the second window in response to a modification of the first window.

16. The computer-readable storage of claim 15, wherein the first application program and the second application program are the same application program.

17. The computer-readable storage medium of claim 15, further comprising an instruction to perform a step of sending an instruction to group the first window and the second window into a common window.

18. The computer-readable storage medium of claim 17, wherein the common window is configured to be accessed by the first application program.

19. The computer-readable storage medium of claim 17, wherein the common window is configured to be modified by at least one of the first application program and the second application program.

* * * * *